United States Patent [19]

Ambur et al.

[11] Patent Number: 5,247,417
[45] Date of Patent: Sep. 21, 1993

[54] SHUTTER STOP MECHANISM FOR DISK CARTRIDGES

[75] Inventors: Gregg A. Ambur, Wahpeton, N. Dak.; David L. Hubbling, Breckenridge, Minn.

[73] Assignee: Minnesota Mining and Manufacturing Company, St. Paul, Minn.

[21] Appl. No.: 769,949

[22] Filed: Sep. 30, 1991

[51] Int. Cl.⁵ .......................................... G11B 23/03
[52] U.S. Cl. ................................................. 360/133
[58] Field of Search ........................................ 360/133

[56] References Cited

U.S. PATENT DOCUMENTS

| 4,497,009 | 1/1985 | Oishi et al. | 360/133 |
|---|---|---|---|
| 4,550,354 | 10/1985 | Wakabayashi et al. | 360/133 |
| 4,780,784 | 10/1988 | Covington et al. | 360/133 |
| 4,785,369 | 11/1988 | Ommori et al. | 360/133 |
| 4,807,079 | 2/1989 | Takahashi | 360/133 |
| 4,811,151 | 3/1989 | Kanazawa et al. | 360/133 |
| 4,839,953 | 6/1989 | Mizuta | 29/225 |
| 4,849,844 | 7/1989 | Kato et al. | 360/133 |
| 4,851,948 | 7/1989 | Kato et al. | 360/133 |
| 4,853,817 | 8/1989 | Mizuta et al. | 360/133 |
| 4,918,559 | 4/1990 | Maruyama et al. | 360/133 |
| 4,935,835 | 6/1990 | Muehlhausen | 360/133 |
| 4,943,880 | 7/1990 | Muehlhausen et al. | 360/133 |
| 5,021,913 | 6/1991 | Overland et al. | 360/133 |

FOREIGN PATENT DOCUMENTS 0218231 4/1987 European Pat. Off. .
0264237 4/1988 European Pat. Off. .

Primary Examiner—Bruce C. Anderson
Attorney, Agent, or Firm—Gary L. Griswold; Walter N. Kirn; Charles D. Levine

[57] ABSTRACT

A disk cartridge includes a rotatable disk, a cartridge case for housing the disk, and a U-shaped shutter slidably disposed on the front wall of the cartridge case. The cartridge case includes upper and lower walls, and a head access opening formed in both walls adjacent the front wall to access the disk. The access opening is opened and closed by the shutter which is biased closed by a spring. A projection mounted on the shutter contacts and locates the spring between one of the cartridge case side walls and the projection. A tab is mounted on the cartridge case and contacts the projection to stop movement of the shutter when the shutter is biased in the closed position.

5 Claims, 2 Drawing Sheets

SHUTTER STOP MECHANISM FOR DISK CARTRIDGES

TECHNICAL FIELD

The present invention relates to rigid disk cartridges. More particularly, the present invention relates to shutter stop mechanisms for magnetic or optical diskette cartridges.

BACKGROUND OF THE INVENTION

Rigid recording disk cartridges having a circular, floppy, magnetic or optical disk rotatably mounted within a disk cartridge case are well known. The cartridge is mountable in a disk drive apparatus to rotate and access the recording disk by a magnetic or optical recording head for recording or reproducing information. The disk cartridge includes a rotatable magnetic or optical disk, a cartridge case for housing the disk having a central axis and a front wall, and a U-shaped shutter slidably disposed on the front wall of the case.

Upper and lower walls mate to form the outer dimensions of the cartridge case. A drive shaft opening is formed through a central portion of the lower wall to receive a drive shaft to rotate the magnetic disk within the cartridge case. A head access opening is formed in the upper and lower walls between the central axis and the front wall to access the magnetic disk. The head access opening is opened and closed by the shutter which slides between open and closed positions. A spring biases the shutter in the closed position to cover and close the head access opening. When the cartridge is inserted into the disk drive, the shutter is moved to the open position by the disk drive to provide access to the disk. The shutter may also include one or more tabs which ride in a slot in the wall of the cartridge to guide the shutter.

A shallow indented portion is formed on both the upper and lower walls for receiving the shutter. Each indented portion has a U-shaped edge on a respective wall. The portion of each U-shaped edge at the side toward which the shutter is biased serves as a stop for the shutter when the shutter is biased closed. However, when the cartridge is removed from a disk drive and the shutter is biased to its closed position, the shutter can slide past the edge and ride over the U-shaped edge to encompass the thicker portion of the case as there is not sufficient interference between the edge and the shutter. This problem is particularly acute with plastic shutters, which deform more easily than metal shutters. This shutter displacement frequently results from the cartridge being dropped during handling. This can prevent the shutter from opening when inserted into the disk drive or prevent the cartridge from loading into the drive when the cartridge is next inserted into the disk drive. This can damage the cartridge and result in data loss.

U.S. Pat. Nos. 5,021,913 to Overland et al., 4,853,817 to Mizuta et al., 4,851,948 to Kato et al., 4,839,953 to Mizuta, and 4,785,369 to Ommori et al. are examples of magnetic disk cartridges in which the shutter spring is connected to the shutter with a shutter spring hook formed on the shutter. These cartridges rely on the U-shaped edge of the indented portion at the side toward which the shutter is biased to serve as a shutter stop.

European Patent Application Publication No. 264,237 discloses a disk cartridge in which the shutter can slide to either side of the head access opening. Abutting plates 35A and 35B serve as anchoring points for opposing torsion springs which push the shutter toward the center of the cartridge to close the cartridge. The shutter does not stop against the cartridge and these plates do not extend to the ends of the shutter slide area as the shutter must be able to slide to both sides of the head access opening.

European Patent Application Publication No. 218,231 discloses a disk cartridge in which the shutter stops against a stopper 5 to prevent the shutter from opening inadvertently. However, the stopper does not work with the shutter engagement mechanism used in 3.5 inch microfloppy disk cartridge drives. With 3.5 inch disk cartridges and drives, an engagement pin in the drive slides the shutter open from right to left, as viewed from above, as the cartridge is inserted in the drive. As the cartridge is ejected from the drive, a spring forces the shutter to the right until it contacts a vertical ridge in the cartridge case. The ridge stops the shutter and the shutter is held against the ridge by the spring. This ridge is small relative to the shutter and cartridge manufacturing tolerances. If the shutter is too wide and the mechanical interference between the shutter and the cartridge is too small, the shutter can override the ridge and becomes stuck on the cartridge. When the shutter is next inserted into the drive, the engagement pin cannot open the shutter and the cartridge will not function and may stick in the drive. With resin-based shutters, the probability of shutter override is greater as the flexural modulus for resins is much lower than for steels.

Neither of these disclosures addresses the problem of preventing shutter misalignment in 3.5 inch microfloppy disk cartridge drives. There is a need for a shutter stop mechanism which prevents such shutter misalignment.

SUMMARY OF THE INVENTION

The present invention improves on the shutter stop devices of known disk cartridges using 3.5 inch microfloppy disk cartridge drives by providing an additional shutter stop. The disk cartridge includes a rotatable magnetic disk, a cartridge case for housing the disk having a central axis and a front wall, and a U-shaped shutter slidably disposed on the front wall of the cartridge case. The U-shaped shutter includes an upper arm, a lower arm, and a base portion which interconnects the upper and lower arms.

A generally rectangular upper wall and a generally rectangular lower wall mate to form the outer dimensions of the cartridge case. A drive shaft opening is formed through a central portion of the lower wall and receives a drive shaft to rotate the disk within the cartridge case. A head access opening is formed in both the upper and lower walls between the central axis and the front wall to provide access to the disk. The head access opening is opened and closed by the shutter which has an opening which registers therewith.

A spring biases the shutter closed. A projection is mounted on the base portion of the shutter and contacts and locates the spring between one of the cartridge case side walls and the projection. Preferably, the spring is a torsion spring and the projection has a hook which receives the adjacent end of the torsion spring. A tab is mounted on the cartridge case and stops movement of the shutter when the shutter is biased in the closed position. The tab contacts the projection on the side opposite that contacted by the spring when the shutter is in the closed position.

DETAILED DESCRIPTION OF PREFERRED EMBODIMENTS

Figure 1:
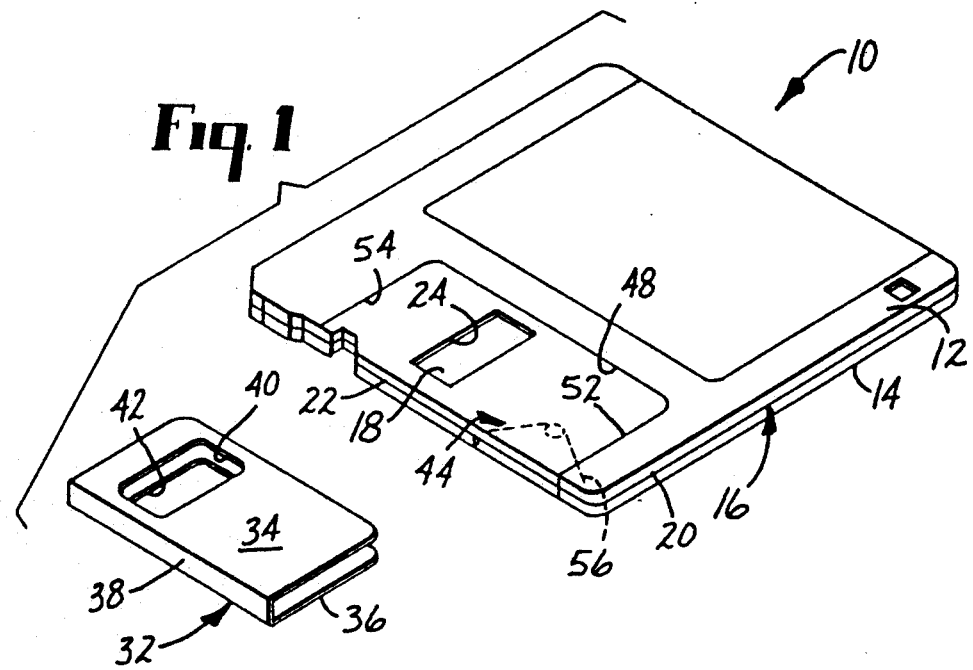
FIG. 1 is a perspective view of a disk cartridge according to the present invention.
Figure 2:
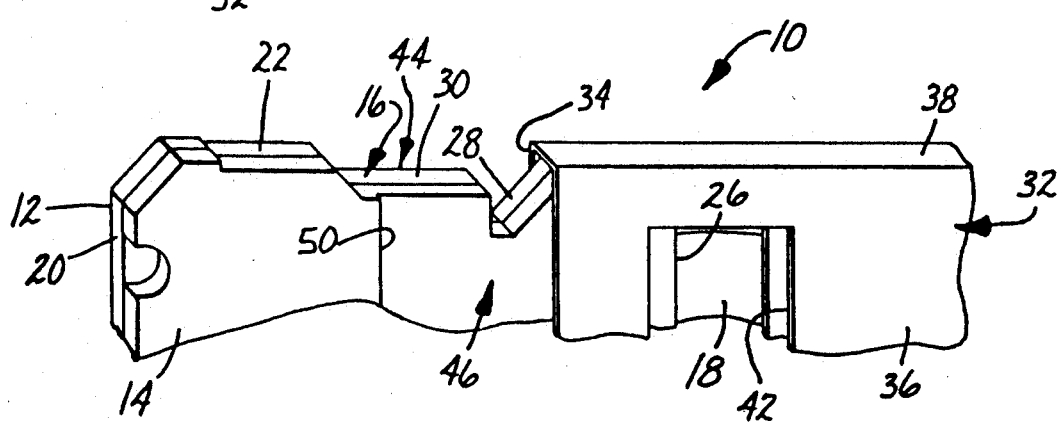
FIG. 2 is a top perspective view of the disk cartridge of FIG. 1 showing the front wall.

A 3½ inch rigid disk cartridge is illustrated in the figures and described below. Nonetheless, the present invention could also be adapted for use with 5¼ inch disk cartridges, 2 inch disk cartridges, or other size cartridges having shutters. Referring to FIGS. 1 and 2, the cartridge 10 includes an upper case wall 12 and a lower case wall 14 which are substantially identical in shape and mate to form a thin, substantially rectangular case 16. The case 16 is preferably formed of a rigid plastic material such as injection molded ABS resin. A circular floppy disk 18 formed of a magnetizable composition and having a circular central hub typically formed of metal is rotatably mounted within the case 16 between two circular nonwoven pads or wipers (not shown) which serve as shock absorbers and cleaners for the disk 18. Each wiper contacts the disk surfaces to wipe debris from the disk 18 and permit the disk 18 to rotate without interference from the case walls 12, 14.

Peripheral edge walls extend perpendicularly from the upper and lower case walls 12, 14 and form the side walls 20 and the front wall 22 of the case 16, and an interior pocket for the disk 18. The lower case wall 14 has a central opening (not shown) aligned with a central axis of the disk 18 for receiving a drive shaft of a disk drive apparatus (not shown) to rotate the disk 18 within the case 16.

The upper and lower case walls 12, 14 also have elongated, generally rectangular access openings 24, 26 located between the central axis of the case 16 and the front wall 22. The access openings 24, 26 permit a read-write head of the disk drive apparatus to access the disk 18. A groove 28 is provided on the front wall 22 between the access openings 24, 26 and one side of the case 16. When the cartridge 10 is inserted into a disk drive, a shutter actuation pin in the disk drive contacts the front wall 22 in a recess 30 and slides toward the groove 28. This slides a U-shaped shutter 32 until the actuation pin stops in the groove 28 and the access openings 24, 26 are uncovered.

The U-shaped shutter 32 is slidably disposed on the front wall 22 of the cartridge case 16 and is movable between an open and a closed position. The shutter 32 may be metal or plastic and includes an upper arm 34, a lower arm 36, and a base portion 38 which interconnects the upper and lower arms 34, 36. The upper arm 34 has an opening 40 which registers with the upper head access opening 24. The lower arm 36 has an opening 42 which registers with the lower head access opening 26. This permits access to the disk 18 by the read-write head when the shutter 32 is in the open position. The shutter 32 slides over a sliding surface formed by an upper indented portion 44 and a lower indented portion 46. The indented portion 44 is bordered on three sides by a U-shaped edge 48, and the indented portion 46 is bordered on three sides by a U-shaped edge 50. The shutter 32 may also include tabs (not shown) which ride within grooves (not shown) on the sliding surface.

Figure 3:
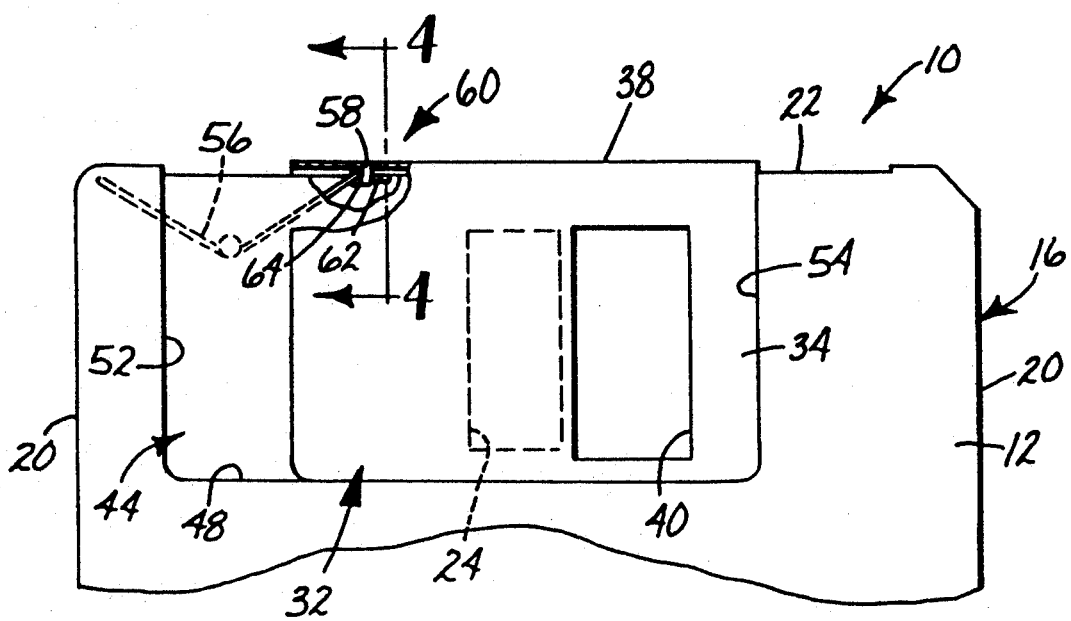
FIG. 3 is a top view of the disk cartridge of FIG. 1.
Figure 4:
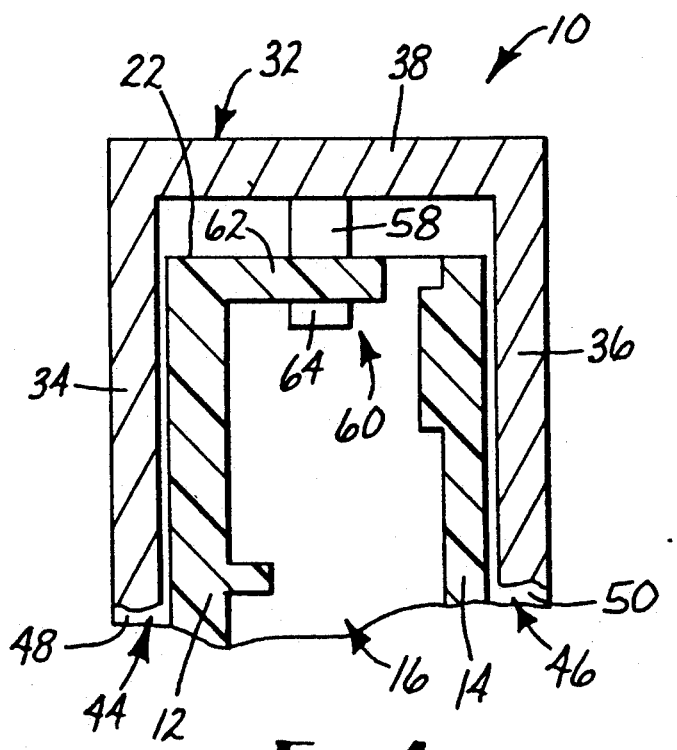
FIG. 4 is a cross-sectional view of the disk cartridge of FIG. 3 taken along line 4—4 of FIG. 3.

In the closed position, the left edge of the shutter 32 is disposed against the left arm 52 of the U-shaped edge 48 as shown in FIG. 2. In the open position, the right edge of the shutter 32 is disposed against the right arm 54 of the U-shaped edge 48. The shutter 32 is biased in the closed position by a spring 56. A projection 58 is mounted on the base portion 38 of the shutter 32 and contacts and locates the spring 56 between one of the cartridge case side walls 20 and the projection 58, as shown in FIGS. 1, 3, and 4.

When the shutter 32 moves from the open to the closed position, the left edge of the shutter 32 should be stopped by the left arm 52 of the U-shaped edge 48. However, the shutter 32 can tend to slide past the left arm 52 as there is not sufficient interference between the arm 52 and the shutter 32, particularly after the cartridge has been damaged such as by dropping.

Shutter drop, both vertical and horizontal, describes damage to the shutter 32 or disengagement of the shutter 32 from the case 16 when the cartridge 10 is dropped during handling. This damage is more common with plastic shutters 32. Vertical shutter drop occurs when the cartridge 10 is dropped directly on the shutter 32. Disengagement can be prevented and damage can be mitigated by increasing the interference between shutter tabs and complementary sliding surface grooves. Horizontal shutter drop occurs when the cartridge 10 is dropped parallel to the sliding direction of the shutter 32. Failure is embodied by the shutter 32 riding over the left arm 52 of the U-shaped edge 48 to encompass the thicker portion of the case 16 adjacent the indented portions 44, 46. This increases the force required to slide the shutter 32 along the cartridge 10, possibly to a level exceeding that which can be provided by the shutter actuation pin. This can prevent the shutter 32 from opening and the cartridge 10 from loading into the drive. This failure can be prevented by increasing the interference between the case 16 and the shutter 32 to increase the deflection required to bend the shutter 32. It has been found that this can be accomplished by thickening the case 16, squaring the boundaries of the indented portions 44, 46, or narrowing the internal clearance of the shutter 32. However, further improvements are desired to reduce and prevent shutter drop failures.

Shutter drop failure is prevented by providing another stop 60 which stops movement of the shutter 32 when the shutter 32 is biased in the closed position to prevent misalignment of the shutter 32. As best shown in FIGS. 3 and 4, the stop 60 includes a tab 62 which is mounted on the front wall 22 of the cartridge case 16. When the shutter 32 is in the closed position, the tab 62 contacts the projection 58, which also serves as part of the stop 60, on the side opposite that contacted by the spring 56. This provides a more positive shutter stop than merely relying on the engagement of the shutter 32 with the left arm 52 of the upper U-shaped edge 48. Preferably, the spring 56 is a torsion spring and the projection 58 has a hook 64 which receives the adjacent end of the spring 56.

This shutter stop system can be incorporated into both plastic and metal shutters. The positive stop provided by the interaction between the projection 58 and the tab 62 is very strong. This is because the U shape of the shutter 32 is geometrically stable and the projection 58 is located on the base portion 38 which is a strong portion of the shutter 32. Shutter side drop failures with this stop can only occur if either the projection 58 or the tab 62 catastrophically fail, an event which will not happen absent design flaws. Additionally, the clearance between the shutter 32 and the upper and lower case walls 12, 14 does not affect the operation of this shutter stop. Nor is the rigidity of the upper and lower arms 34, 36 of the shutter 32 critical to the operation of the shutter stop.

This shutter stop design can be formed in cartridge cases 16 and shutters 32 by molding, as with known cartridges 10. Any molding tool used to mold these components can be modified easily to incorporate this design.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope or spirit of the invention. For example, although magnetic disks have been described, the invention can be used with optical and other media disks as well.

We claim:

1. A substantially flat rigid disk cartridge for housing a rotatable disk comprising:
    a cartridge case for housing the disk and comprising a front wall, side walls, generally rectangular upper and lower walls mating to form the outer dimensions of the cartridge case, and a head access opening formed in at least one of the upper and lower walls adjacent the front wall for providing access to the disk;
    a U-shaped shutter having an upper arm, a lower arm, and a base portion interconnecting the upper and lower arms, the shutter being mounted on the cartridge case to open and close the head access opening, wherein the shutter is disposed on the front wall of the cartridge case and is slidable between an open position and a closed position with the upper arm of the U disposed against the upper wall, the lower arm of the U disposed against the lower wall, and the base portion of the U disposed against the front wall;
    means for biasing the shutter in the closed position;
    means mounted on the shutter for contacting and locating the biasing means between one of the cartridge case side walls and the contacting means; and
    means for stopping movement of the shutter in the direction of the biasing force when the shutter is biased toward the closed position, the stopping means comprising a tab mounted on the cartridge case which contacts the contacting means when the shutter is in the closed position.

2. The disk cartridge of claim 1 wherein the biasing means comprises a spring and the contacting means comprises a projection.

3. The disk cartridge of claim 2 wherein the projection is mounted on the base portion of the shutter.

4. The disk cartridge of claim 2 wherein the stopping means tab contacts the projection on the side of the projection opposite that contacted by the spring.

5. The disk cartridge of claim 2 wherein the spring is a torsion spring and the contacting means projection comprises a hook which receives the adjacent end of the torsion spring.

* * * * *